United States Patent [19]

Wessel et al.

[11] 4,230,083
[45] Oct. 28, 1980

[54] FUEL SUPPLY APPARATUS

[75] Inventors: Wolf Wessel, Oberriexingen; Konrad Eckert, Stuttgart, both of Fed. Rep. of Germany

[73] Assignee: Robert Bosch GmbH, Stuttgart, Fed. Rep. of Germany

[21] Appl. No.: 966,705

[22] Filed: Dec. 5, 1978

[30] Foreign Application Priority Data

Feb. 11, 1978 [DE] Fed. Rep. of Germany ....... 2805786

[51] Int. Cl.³ .......................................... F02M 39/00
[52] U.S. Cl. ................................. 123/450; 261/50 A; 261/44 A
[58] Field of Search ............... 123/139 AW, 139 BG, 123/119 F; 261/50 A, 44 R, 44 A

[56] References Cited

U.S. PATENT DOCUMENTS

| 1,003,101 | 9/1911 | Gumz | 261/50 A |
| 3,777,727 | 12/1973 | Kirchner et al. | 123/139 AW |
| 4,154,203 | 5/1979 | Peters et al. | 123/139 AW |
| 4,170,975 | 10/1979 | Wessel et al. | 123/139 AW |

FOREIGN PATENT DOCUMENTS 284185 7/1952 Switzerland ........................... 261/50 A Primary Examiner—Ira S. Lazarus
Assistant Examiner—Magdalen Moy
Attorney, Agent, or Firm—Edwin E. Greigg

[57] ABSTRACT

A fuel supply apparatus is proposed which serves to control a mixture-compressing, externally ignited internal combustion engine. The fuel supply apparatus includes at least one fuel depositing point in the air intake manifold, within which an air flow rate meter and an arbitrarily actuatable throttle valve are disposed in series and the air flow rate meter is moved against a restoring force in accordance with the air quantity flowing therethrough. The air flow rate meter, which is embodied as a flat rotary element in the shape of a circular sector, more or less widely opens an aperture which defines the cross-sectional width of the air intake manifold and is rotatably fixed about a rigid shaft extending in the direction of air flow. The intake manifold pressure upstream of the air flow rate meter acts on one side of the air flow rate meter, and the intake manifold pressure downstream of the air flow rate meter acts on the other side of the air flow rate meter. In a plane downstream of the air flow rate meter which is parallel to the aperture, there is an arbitrarily actuatable lobed element, by means of which the flow-through cross-sectional area at the aperture can be varied in accordance with the operating characteristics of the internal combustion engine.

6 Claims, 2 Drawing Figures

FUEL SUPPLY APPARATUS

BACKGROUND OF THE INVENTION

The invention relates to a fuel supply apparatus for mixture-compressing, externally ignited internal combustion engines with at least one fuel depositing point in the intake manifold, in which an air flow rate meter and an arbitrarily actuatable throttle valve are disposed in series and the air flow rate meter is moved against a restoring force in accordance with the quantity of air flowing therethrough. Such a fuel supply apparatus is already known; however, its structural length leads to installation difficulties because of the limited space available beneath the hood of the engine compartment of a motor vehicle. It is further disadvantageous that the fuel-air ratio is influenced solely by means of varying the fuel pressure.

OBJECT AND SUMMARY OF THE INVENTION

The fuel supply apparatus has the advantage over the prior art that it has a very limited space requirement and is easy to produce.

By means of the features disclosed in the dependent claims, advantageous further embodiments and improvements of the fuel supply apparatus disclosed hereinafter are possible.

It is particularly advantageous that a rotary element is disposed parallel to the aperture downstream of the air flow rate meter, so that the flow-through cross-sectional area at the aperture is variable in accordance with operating characteristics of the internal combustion engine in order to influence the fuel-air ratio.

The invention will be better understood as well as further objects and advantages thereof become more apparent from the ensuing detailed description of a preferred embodiment taken in conjunction with the drawings.

DESCRIPTION OF THE PREFERRED EMBODIMENT

Figure 1:
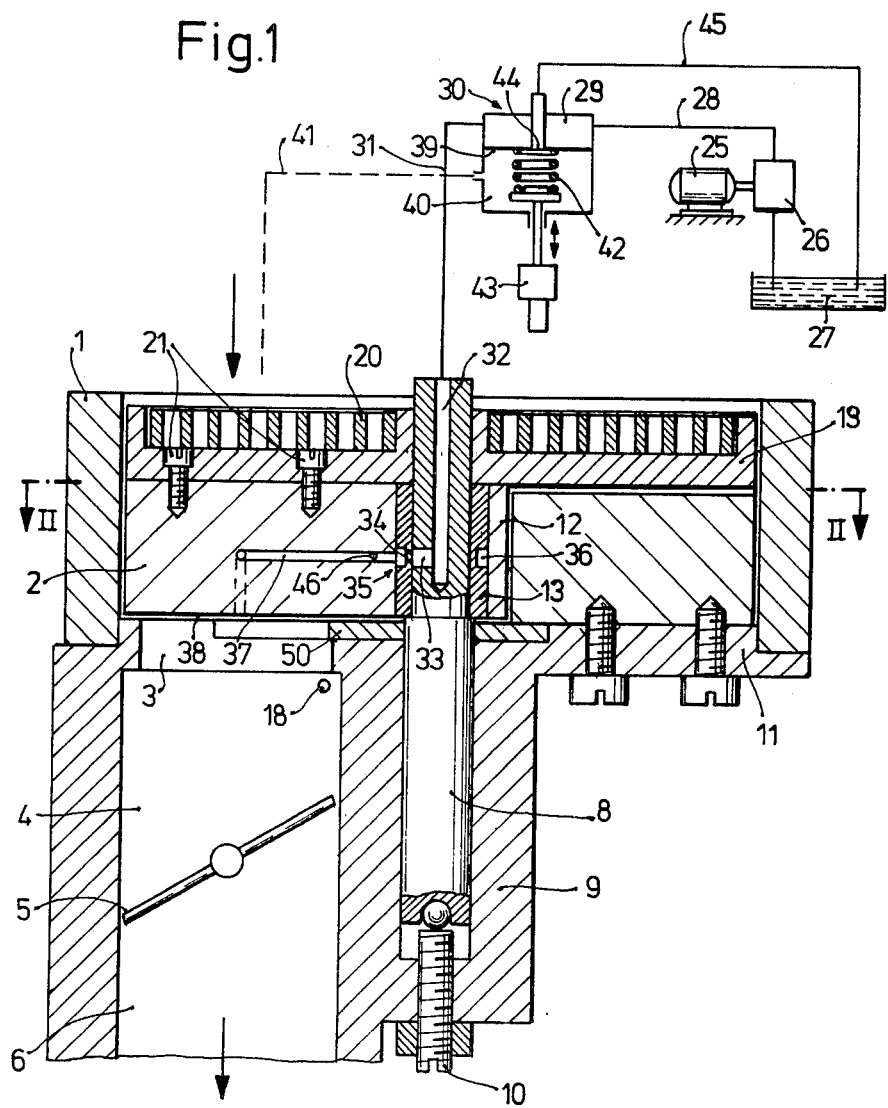
FIG. 1 is a cross-sectional view through a fuel supply apparatus as taken along the line I—I of FIG. 2.
Figure 2:
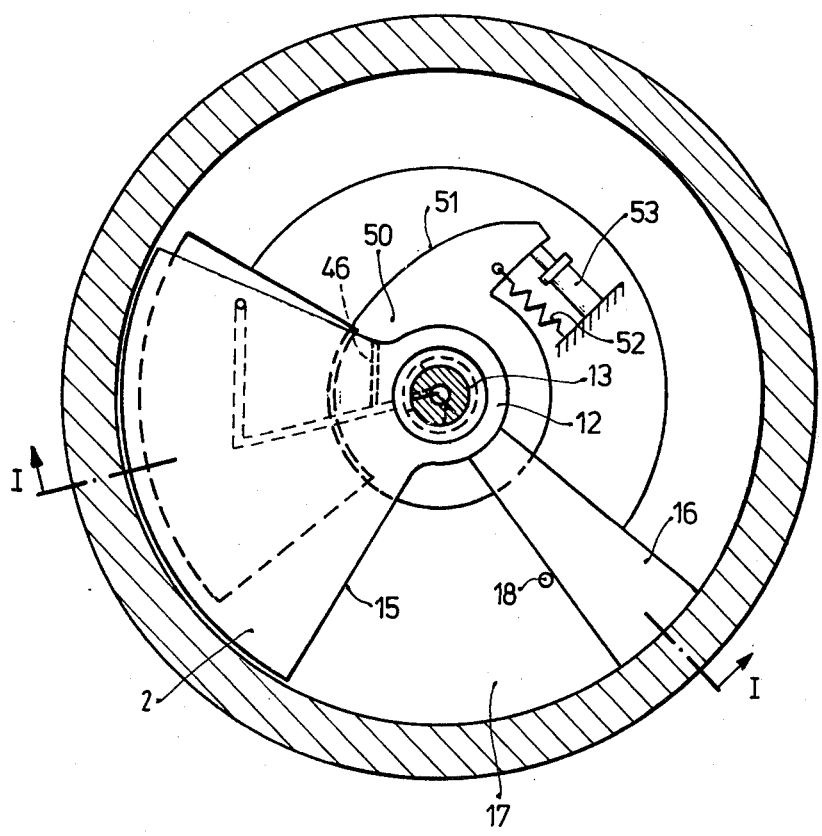
FIG. 2 is a view taken along the line II—II of FIG. 1.

Turning now to the drawings of the fuel supply apparatus shown in FIG. 1, the air required for combustion flows in the direction of the arrow downstream of an air filter, which is not shown, into a housing 1 with an air flow rate meter 2 disposed therein and further flows via an aperture 3 through a section 4 of the air intake manifold that is provided with an arbitrarily actuatable throttle valve 5 and thence through a section 6 of the manifold to one or more cylinders, not shown, of a mixture-compressing, externally ignited internal combustion engine. As FIG. 2 shows, the air flow rate meter 2 is embodied as a relatively flat rotary member in the form of a circular sector, which is rotatably fixed about a rigid bearing shaft 8 transversely with respect to the flow of air. The bearing shaft 8 is disposed within a tubular bearing member 9 that extends parallel to the direction of air flow. The bearing shaft 8 is provided with a depression in which a ball element is supported and is axially adjustable by means of a set screw 10. The housing 1 of the air flow rate meter 2 is advantageously embodied as a tubular element and is seated on a holding fixture 11 of the intake mainfold. A control sleeve 13 is pressed into the hub 12 of the air flow rate meter 2 and by means of this sleeve the air flow rate meter 2 is fixed on the bearing shaft 8. A control chamber 17 (FIG. 2) is enclosed between the lateral surface 15 of the air flow rate meter 2 which surface 15 is remote from the aperture 3 and the corresponding surface of a wedge-like member 16 which is also radially disposed within the housing 1. The control chamber 17 communicates with the intake manifold pressure in the intake manifold section between air flow rate meter 2 and throttle valve 5 by means of a throttle bore 18, which discharges into the intake manifold section 4 downstream of the air flow rate meter 2. The control chamber 17 is limited in the flow direction by a cap 19 on the one side which is approximately semicircular and by the holding fixture 11 on the other side. One end of a spiral spring 20 contacts the cap 19, while the other end of the spiral spring 20 is connected to the bearing shaft 8. The cap 19 is connected by means of screws 21 with the air flow rate meter 2 which is embodied as a rotary member, so that the spiral spring serves as a restoring force for the air flow rate meter 2. The air flow rate meter 2 embodied as a rotary member moves with respect to the aperture 3 in accordance with an approximately linear function of the quantity of air flowing through the air intake manifold, so that for a constant air pressure prevailing upstream of the air flow rate meter, the pressure prevailing between the air flow rate meter 2 and the throttle valve 5 also remains constant.

The fuel supply in this fuel supply apparatus takes place by means of a fuel pump 26 driven by an electromotor 25. The pump 26 draws fuel from a fuel container 27 and delivers it via a line 28 to a chamber 29 of a pressure regulating valve 30. The fuel proceeds from the chamber 29 via a line 31 into an axial bore 32 of the bearing shaft 8. The bore 32 communicates with a radial control opening 33 of the bearing shaft 8. The control opening 33 cooperates with a control slit 34 in the control sleeve 13 and thus the control opening 33 and the control slit 34 comprise a fuel apportionment valve 35. The control slit 34 discharges into an annular groove 36 provided in the control sleeve 13. From the annular groove 36, an injection line 37 extends within the air flow rate meter 2 to the front face 38 of the air flow rate meter oriented toward the aperture 3 and discharges into the region of highest air flow speed in the vicinity of the flow-through cross section of the aperture 3 which is opened by the air flow rate meter 2. In accordance with the adjustment of the air flow rate meter 2, a quantity of fuel is apportioned at the fuel apportionment valve 35 which is proportional to the induced quantity of air. The apportionment of fuel at the valve 35 takes place at a constant pressure differential. To this end, a chamber 40, which is separated from the chamber 29 of the pressure regulating valve by a diaphragm 39, communicates via an air line 41, indicated by broken lines, with the intake manifold section upstream of the air flow rate meter 2. Thus the same pressure prevails in the chamber 40 as that which is downstream of the control slit 34. The pressure regulating valve 30 is urged in the closing direction by a spring 42 disposed within the chamber 40. The force of the spring 42 may be varied in accordance with operating characteristics of the engine. An electromagnet 43, as an example, may serve this purpose by contacting the spring 42, or a supplementary force dependent on operating characteristics may act directly on the diaphragm 39, parallel to the spring 42. The pressure regulating valve 30 is embodied as a flat seat valve, with the diaphragm 39 as the movable valve member and a fixed valve seat 44, by means of which fuel can reach a return flow line 45 which discharges into the fuel container 27. It is advantageous to add air to the apportioned fuel before it is injected into the air intake manifold. To this end, the injection line 37 communicates via a bore 46 with the intake manifold section upstream of the air flow rate meter 2. The addition of air to the apportioned fuel quantity before the injection into the air intake manifold has the advantage of providing a better mixture preparation and an improved fuel transport to the discharge point of the injection line.

Downstream of the air flow rate meter 2 a relatively flat centrally apertured element 50 is disposed in a plane which is parallel to the aperture 3. The element 50 is rotatably fixed about the bearing shaft 8 and has at least one offstanding lobe portion 51 (see FIG. 2). This lobed element 50 is rotatable against the force of a spring 52 in the direction of a reduction of the flow-through cross-sectional area at the aperture 3, which area is controlled by the air flow rate meter 2. This rotation of the element 50 in the direction of a reduction of the flow-through cross-sectional area may take place in accordance with operating characteristics of the internal combustion engine, as an example, by means of an expansible element 53 operating in accordance with temperature. During the warm-up phase of the engine, the expansible element 53 pivots the lobed area of element 50 in the direction of a reduction of the flow-through cross-sectional area in such a manner that the air flow rate meter 2, in order to maintain the constant pressure differential at the air flow rate meter, swings in the direction of an enlargement of the opened aperture cross section. Thus, a larger fuel quantity is apportioned at the fuel apportionment valve 35, while with an air flow which remains constant a larger fuel quantity is apportioned and thus there is an enrichment of the fuel. By this means, the desired multiplicative warm-up enrichment is attained in a simple manner without varying the fuel pressure. In place of an expansible element 53 operating in accordance with temperature, a pressure-sensing element could also contact the lobed element 50, in order to adapt the fuel-air mixture to changes in the geodetic altitude.

The foregoing relates to a preferred embodiment of the invention, it being understood that other embodiments and variants thereof are possible within the spirit and scope of the invention, the latter being defined by the appended claims.

What is claimed and desired to be secured by Letters Patent of the United States is:

1. A fuel supply apparatus for mixture-compressing, externally ignited internal combustion engines having a housing, an air intake manifold with at least one fuel depositing point in said air intake manifold, an air flow rate meter and an arbitrarily actuatable throttle valve disposed in series in said air intake manifold and said air flow rate meter is moved against a restoring force in accordance with the quantity of air flowing therethrough, further wherein said housing includes an aperture which leads to said air intake manifold, said air flow rate meter being embodied as a relatively flat rotary member in the form of a circular sector that is arranged to variably open said aperture and swing laterally out of the cross-section of said air intake manifold in an opening motion, a shaft in said housing extending parallel to the direction of air flow in said air intake manifold and being disposed outside of the cross-section of said air intake manifold, said rotary member being fixed on said shaft for rotation transversely with respect to the flow of air in said air intake manifold and subjected on one side to the intake manifold pressure upstream and on the other side thereof to the intake manifold pressure downstream of said air flow rate meter.

2. A fuel supply apparatus in accordance with claim 1 including an arbitrarily actuatable element disposed downstream of said air flow rate meter in close proximity to said aperture and by means of which arbitrarily actuatable element the flow-through cross-sectional area at said aperture is variable.

3. A fuel supply apparatus in accordance with claim 2, further wherein said arbitrarily actuatable element is lobe-shaped and is rotatably fixed about said shaft and means for pivotally moving said arbitrarily actuatable element in accordance with engine operating characteristics to a variable extent into said aperture that leads to said air intake manifold.

4. A fuel supply apparatus in accordance with claim 3, wherein said means for pivotally moving said lobed element comprises an element which operates in accordance with temperature.

5. A fuel supply apparatus in accordance with claim 1 including a fuel apportionment valve and wherein said air flow rate meter is arranged to operate said fuel apportionment valve.

6. A fuel supply apparatus in accordance with claim 5 including an injection line in said air flow rate meter and wherein said fuel apportionment valve includes a control slit and wherein said fuel apportionment valve permits fuel flow from said shaft to said control slit and then to said injection line in said air flow rate meter.

* * * * *